United States Patent [19]
Williams

[11] Patent Number: 5,567,105
[45] Date of Patent: Oct. 22, 1996

[54] AUTOMATED TRANSFER CAR FOR TRANSPORTING MATERIAL

[75] Inventor: Charles V. Williams, Macon, Ga.

[73] Assignee: Brown & Williamson Tobacco Corporation, Louisville, Ky.

[21] Appl. No.: 418,342

[22] Filed: Apr. 7, 1995

[51] Int. Cl.⁶ .................................................. B65G 67/48
[52] U.S. Cl. .......................... 414/360; 414/421; 414/407; 414/359; 414/576
[58] Field of Search ...................... 414/354, 355, 356, 359, 360, 361, 363, 369, 371, 372, 419, 420, 421, 575, 576, 764, 765, 766, 498, 499, 500, 407

[56] References Cited

U.S. PATENT DOCUMENTS

| | | |
|---|---|---|
| 1,253,748 | 1/1918 | Tyson . |
| 2,860,795 | 11/1958 | Zöller ..................... 414/407 |
| 3,144,148 | 8/1964 | Merkner et al. . |
| 3,373,829 | 3/1968 | Suman et al. ............... 414/360 X |
| 3,583,335 | 6/1971 | Schilf et al. ............... 414/360 X |
| 3,608,757 | 9/1971 | Tary . |
| 3,888,587 | 6/1975 | Perl . |
| 4,269,559 | 5/1981 | Focke . |
| 4,303,366 | 12/1981 | Hinchcliffe et al. . |
| 4,455,117 | 6/1984 | Cartoceti . |
| 4,640,656 | 3/1987 | Mattei . |
| 4,986,718 | 1/1991 | Kumata et al. . |
| 5,028,196 | 7/1991 | Richards ................... 414/421 X |

FOREIGN PATENT DOCUMENTS

| | | | |
|---|---|---|---|
| 1256010 | 2/1961 | France ................... 414/359 |
| 482247 | 9/1929 | Germany ................. 414/359 |
| 541900 | 1/1932 | Germany ................. 414/359 |
| 1014028 | 8/1957 | Germany ................. 414/359 |
| 1048227 | 12/1958 | Germany ................. 414/360 |
| 816920 | 4/1981 | U.S.S.R. ................. 414/359 |

*Primary Examiner*—Frank E. Werner
*Attorney, Agent, or Firm*—Charles I. Sherman; John F. Salazar; Middleton & Reutlinger

[57] ABSTRACT

A transfer car for transporting a container of tobacco from a first location to a second location includes an outer frame and an inner frame rotatable within the outer frame. The interior frame is adapted to hold a container therein and is provided with a lid lifter for removing the lid from a container. A system for rotating the container from an upright position to a dumping position is also included. The transfer car is also provided with an internal power source for moving the transfer car from the first location to the second location.

8 Claims, 7 Drawing Sheets

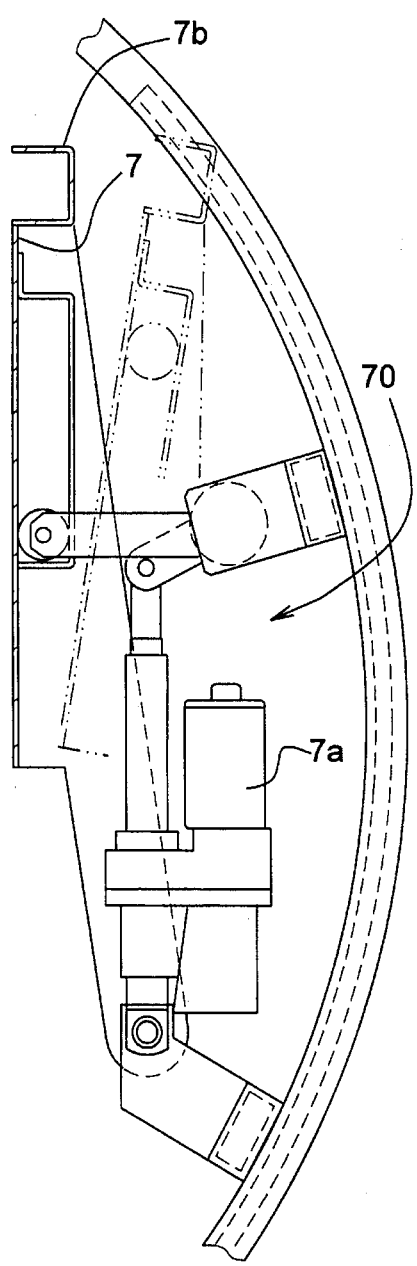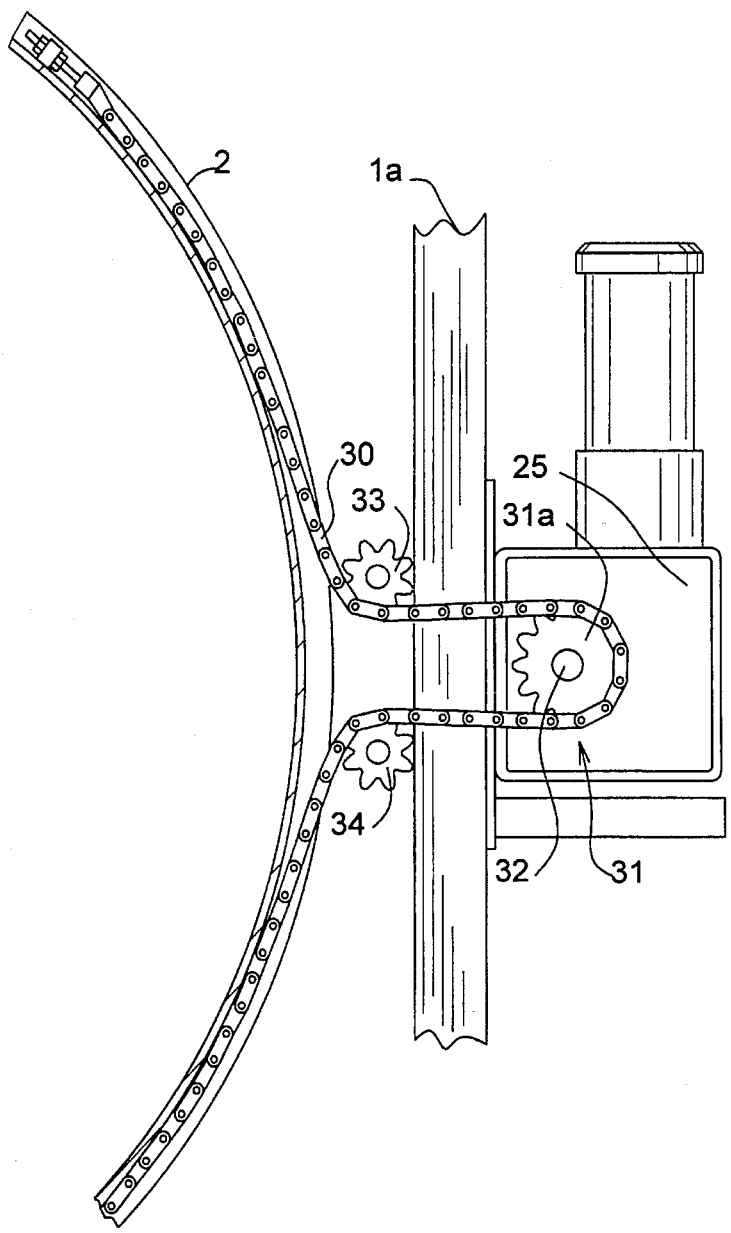
FIG. 8
FIG. 9

AUTOMATED TRANSFER CAR FOR TRANSPORTING MATERIAL

BACKGROUND OF THE INVENTION (a) Field of the Invention

The present invention relates to a transfer car for transporting a container of material from a storage facility and dumping the contents of the container at a preselected site. More particularly, the present invention relates to a transfer car including means to rotate a container mounted onto a transfer car. The transport vehicle rides on a rail system and is self-powered thereby allowing for automated and computerized material transportation and discharging. The transport vehicle allows a container to be loaded into the interior portion of the vehicle whereupon the container is transported to a destination site where the vehicle then inverts the container such that the contents of the container are fully discharged. The vehicle then returns to the storage facility with the empty container and unloads the empty container so that said container can be refilled. The vehicle may then be reloaded with another container whose contents may then be automatically transported to a possibly different dumping site. The transport vehicle provides means for loading the container into the transport vehicle, securing the container within the vehicle, raising the lid of the container, moving the container to a different site, and then inverting the container such that the contents of the container are fully discharged. By providing a transfer car, such as is the subject of the present invention, human intervention is not required for the transferring of the material stored in the containers at a storage facility to the eventual destinations and dumping site.

(b) Description of the Prior Art

While there generally vehicles known for transporting containers of different size and shape material, the Applicant is unaware of any transport vehicle which fulfills the goals of the present invention. The current system utilizes a transfer car which has a shuttle to retrieve a delided container from a rack. Once the container is onboard the transfer car, the transfer car delivers the container to the selected bulker. The container is transferred from the transfer car into a rotating dumper using the same shuttle that was used for loading the transfer car. A rotating dumper is permanently mounted on each tobacco bulker. After the container is dumped, the empty container is loaded onto the transfer car again utilizing the shuttle. The transfer car then delivers the empty container back to the rack and unloads the container using the shuttle again to remove the container from the car to the rack. The Applicant is currently unaware of any transfer vehicles which can load, transport, rotate to varying degrees and dump storage containers as is described herein.

SUMMARY OF THE INVENTION

The present invention is directed towards a transfer car for delivering containers of material, such as tobacco, to a series of bulkers. The transfer car including bulk containers for tobacco and the like is generally a self-powered car mounted on a rail system. The transfer car is designed to receive containers full of tobacco from a storage facility which includes an automated storage and retrieval system wherein the containers are loaded into and secured in the transfer car then transported to another location and dumped. Preferably, the transfer car additionally has an electromagnetic lid lifter for raising a lid away from the loading and unloading opening on the container and securing it in a position away from the opening. The transfer car is provided with a rotatable interior circular portion wherein the container is secured. Moreover, the container rests upon a plurality of support rollers which rotatably engage this interior circular portion. When activated, the interior circular portion is rotated on the support rollers so that the container, securely held therein, is rotated at least 90°, and preferably about 180°, and the contents of said container are discharged. The transfer car includes a plurality of rail car wheels, at least one of which is self powered by a drive unit. A powered conveyor is provided on a lower portion of the transfer car to assist in the removal of an empty container and load a full container back onto the transfer car.

In the present invention, full or loaded containers can be removed from a storage facility, transported to a preselected dump site and dumped at the dump site into, for example, a tobacco car without human intervention. The transfer container assembly provides a system which handles a load of material, such as tobacco, in a rapid and efficient manner without manual assistance or human intervention and with little or no material loss. As shown, the container is held in a secured position with reasonable stability such that there is little or no waste of the material held therein.

BRIEF DESCRIPTION OF THE DRAWINGS

A better understanding of the present invention will be had upon reference to the following description in conjunction with the accompanying drawings, wherein:

FIG. 8 is an enlarged view of a positioning clamp assembly of a container transfer car;

FIG. 9 is an enlarged view of the belt drive combination for rotating the inner circular frame of a transfer car;

DESCRIPTION OF THE PREFERRED EMBODIMENT

Figure 1:
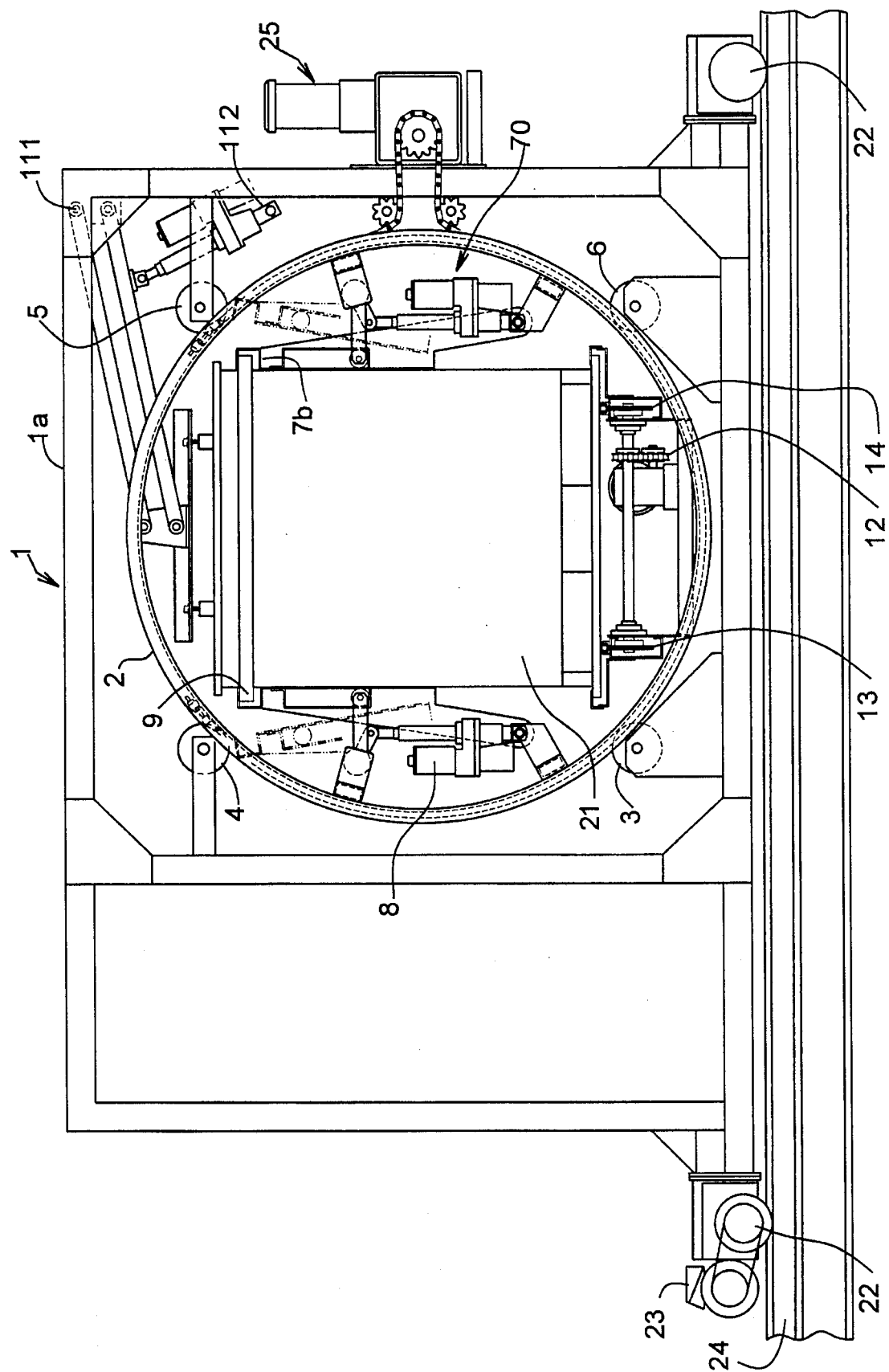
FIG. 1 is a side view of a container transfer car of a preferred embodiment.
Figure 2:
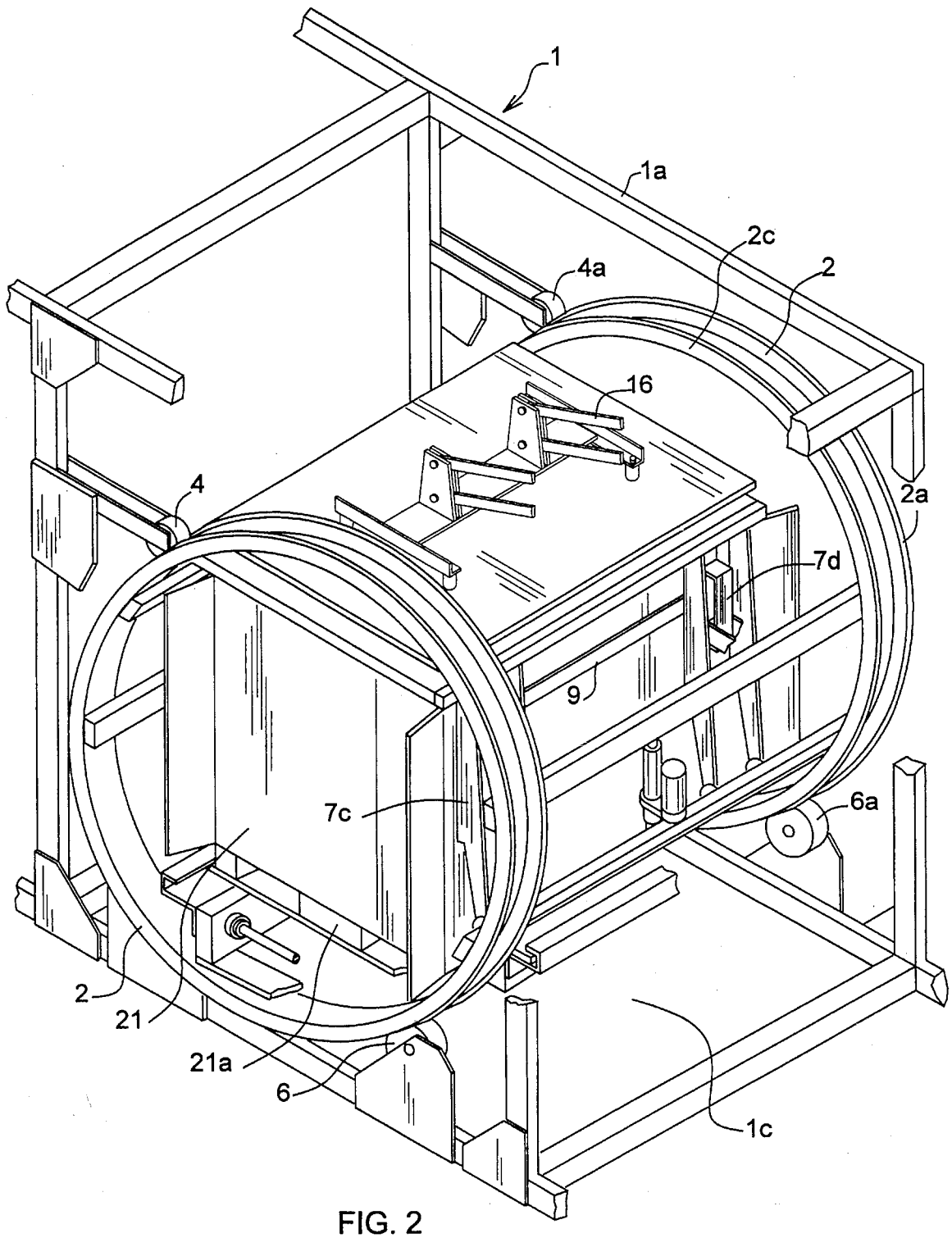
FIG. 2 is a perspective view of the container car of FIG. 1.

As best shown in FIG. 2, transfer car 1 is provided with an exterior frame 1a of generally cubic shape. Frame 1a houses an interior circular frame 2 which is fully rotable within exterior frame 1a. Interior circular frame 2 is shown as having a material transport container 21 located therein, said container 21 having a lateral exterior rib portion 9 on both sides for engaging with a positioning clamp assembly 70, to be discussed hereinafter. Container 21, as more clearly shown in FIG. 10, has a bottom flanged portion 21a with outwardly extending flanges 101 and 102, said flanges being received within C-shaped slots 104 and 103, said slots 104, 103 extending the full length of bottom flanged portion 21a. A powered conveyor 12, as shown in FIG. 1, is provided as the means to load container 21 into the interior circular frame 2. Conveyor 12 is further provided with runners 13 and 14 which contact or engage a bottom surface 21a of container 21 for loading and unloading the container 21 from the transfer car 1.

Figure 10:
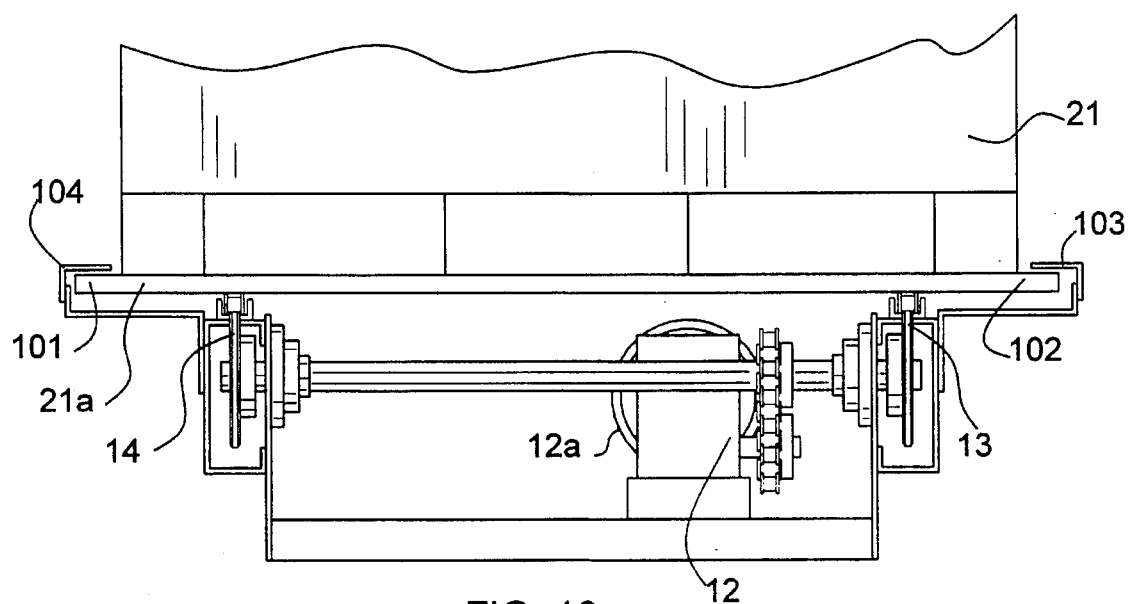
FIG. 10 is an enlarged view of the powered conveyor system utilized for loading and unloading the container of FIGS. 4–7; and, FIG. 11 is an enlarged view of the electromagnetic contacts and actuator arm of the preferred embodiment utilized in lifting a lid from a loading and unloading opening in the container.

As shown in FIG. 10, the drive motor 12a for the power conveyor 12 is reversible so that the container 21 can be conveyed into and out of the interior circular frame 2. This reversible feature of drive motor 12a allows for the proper placement of container 21 within inner circular frame 2 so that the positioning clamp assembly 70 firmly secures the container 21 on rib portion 9. Power conveyor 12 may also contain an over travel sensor (not shown) to detect the correct position and stop the conveyor 12 when the container 21 is properly centered within the interior circular frame 2. The over travel sensor may also detect an error in the position of the container 21 within the inner circular frame 2 and subsequently reverse the power conveyor 12 so that the container 21 can be backed out and then re-positioned within frame 2. If the container 21 cannot be properly loaded within the inner circular frame 2 as detected by the over travel sensor, human intervention may be required. Proper placement or positioning of container 21 allows flange portions 101 and 102 to be secured within C-shaped slots 103 and 104 such that container 21 may not move in a vertical direction regardless of the movement of transfer car 1 or circular frame 2.

As shown in FIG. 8, a positioning clamp assembly 70, is provided for tilting forward container 21 by fully engaging the lateral rib of the container 9, as shown in FIG. 2, so that the container is firmly secured within the transfer car. A motor driven ball screw unit 7a is provided for actuating clamp 70. Moreover, positioning clamp assembly 70 is provided with cleated member 7b for firm grasping of rib member 9. Positioning clamp assembly 70 includes dual positioning arms 7c and 7d on opposite sides of the container 21 thereby providing four points of contact on container 21 to positively and securely hold the container 21 within the frame 2.

As shown in FIG. 1, transfer car 1 is propelled along rail 24 by a plurality of rail wheels 22 in combination with a drive motor 23 attached to at least one of said rail wheels 22. Rail wheels 22 may be located either below outer frame 1a as shown in FIG. 1 or rail wheels 22 may be inverted and located above outer frame 1a so that the transfer car 1 hangs below the rail wheels 22 and rail lines 24. As further shown in FIG. 1, rails 24 are situated below the transfer car 1 so that a plurality of rail wheels 22 propel the transfer car 1 in a horizontal direction along rails 24. Drive motor 23 may propel the transfer car 1 along rails 24 at any preselected speed, such as, for example, a minimum horizontal speed of 200 feet per minute. Rail wheels 21 may be rotated by the drive motor via a chain or belt, as shown in FIG. 1.

Figure 3:
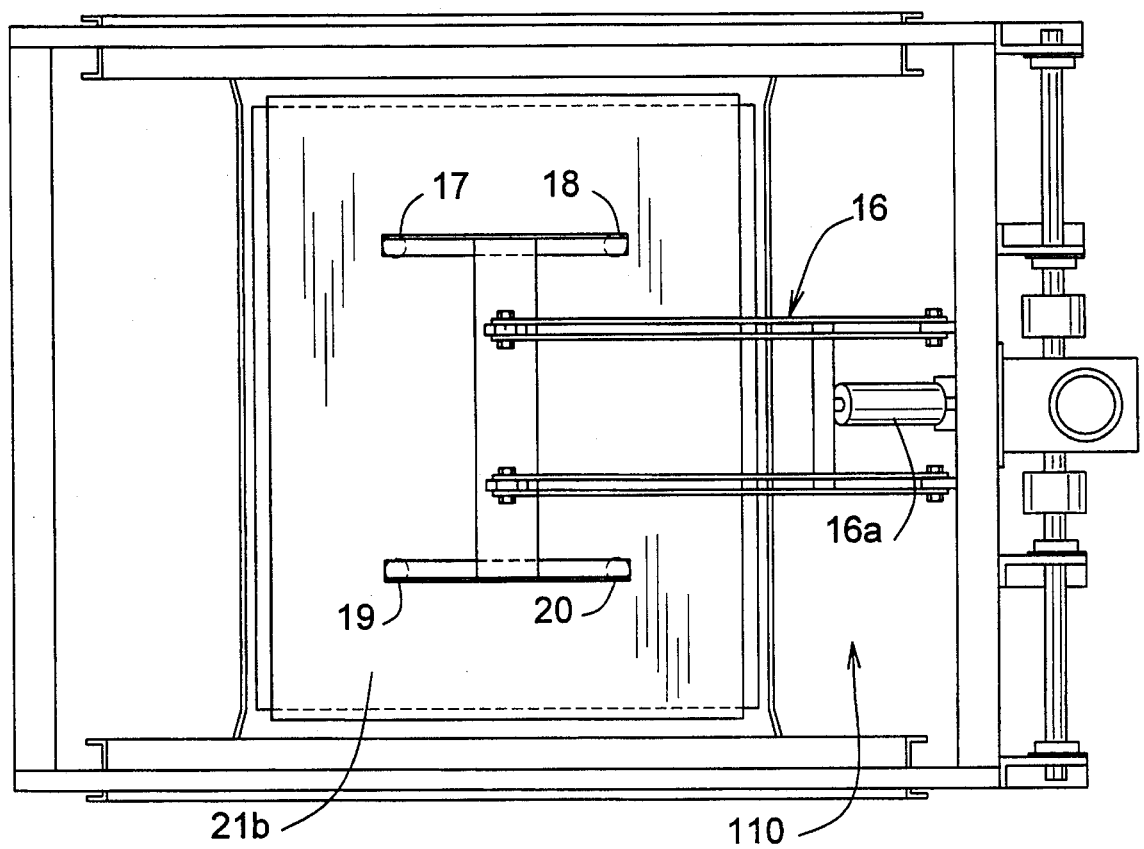
FIG. 3 is a top view of the transfer car of FIG. 1.
Figure 4:
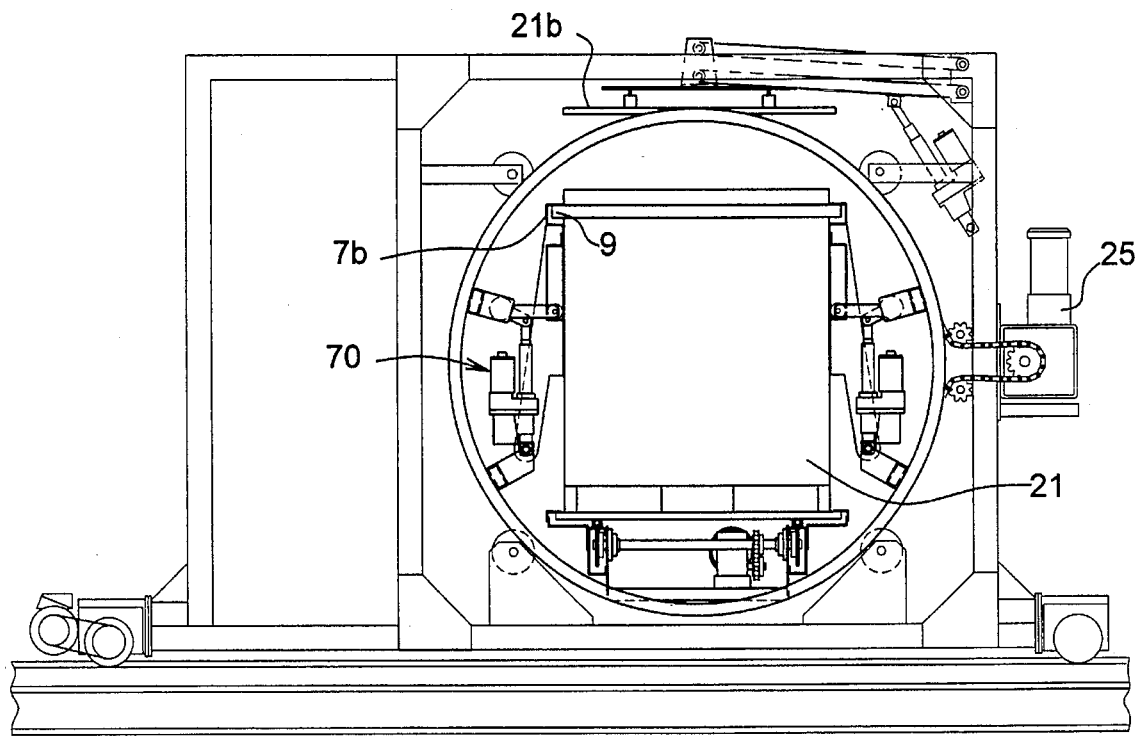
FIGS. 4–7 is the transfer car of FIG. 1 rotating a container held therein.
Figure 11:
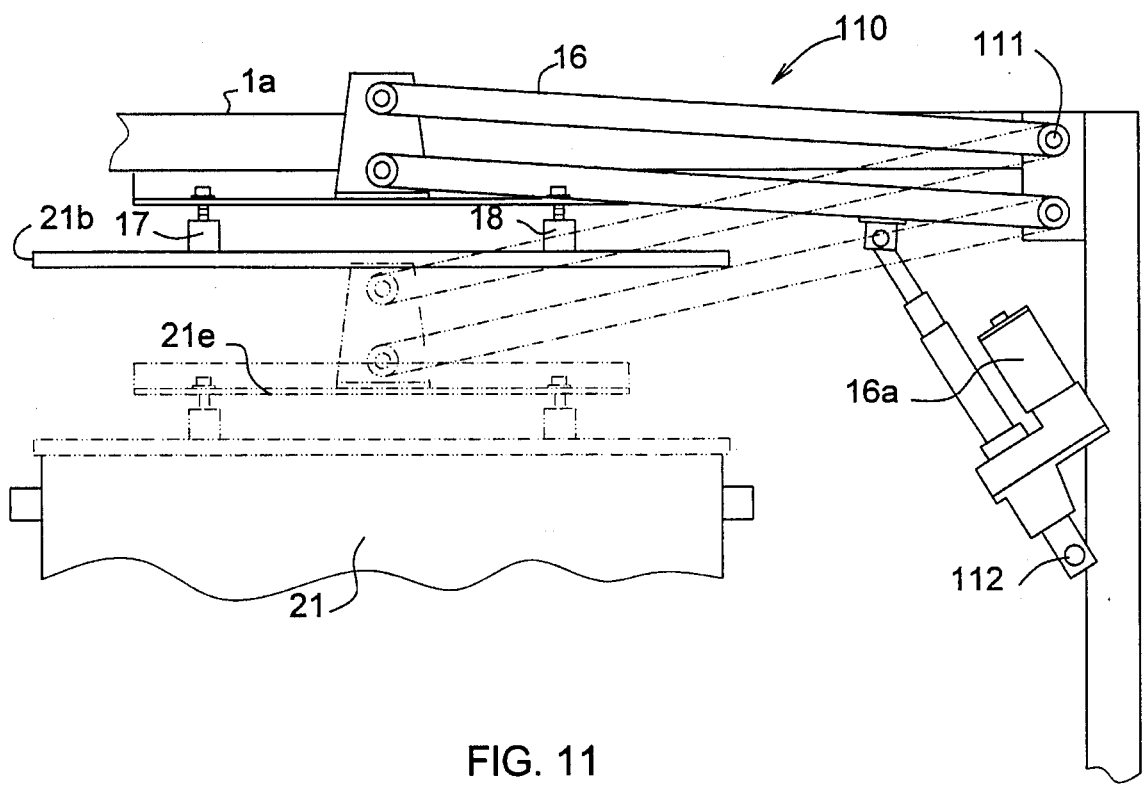

As shown in FIG. 11, the transfer car 1 is provided with a lid lifter assembly 110, the lid lifter assembly 110 being attached to the upper portion of outer frame 1a. A lid lifter actuator arm 16 is hinged at point 111 to outer frame 1a so that actuator arm 16 may raise and lower a lid 21b positioned on container 21. The lid lifter assembly 110 is provided with a plurality of electromagnetic contacts 17 through 20, as shown in FIG. 3, for securely holding container lid 21b. The actuator arm 16 lowers and places the electromagnetic contacts 17 through 20 in close proximity to the lid 21b of container 21 so that when the electromagnetic contacts are magnetized, lid 21b becomes magnetically attached to the lid lifter assembly 110. Actuator arm 16 is attached to a motor driven ball screw unit 16a which is fixed to outer frame 1a at a position denoted by the numeral 112 so that when the motor assembly is actuated, the actuator arm 16 raises the lid 21b away from opening 21e and out of the interior circular frame 2. Once the lid 21b is removed from container 21, and out of the frame 2, the container 21 may be rotated so that the material therein is "dumped". After dumping of the material from inside container 21, the lid lifter assembly 110 replaces the lid 21b over the opening 21e in the container 21 when the container 21 is brought to its upright position. Re-seating of lid 21b is accomplished by reactivating motor ball drive unit 16a thereby lowering arm 16 to place lid 21b back over the opening 21e and deactivating electromagnetic contacts 17 through 20.

As shown in FIG. 9, exterior frame 1a of the transfer car 1 may be fitted with a drive unit 25 which has a drive motor attached to the exterior frame 1a of transfer car 1. The drive motor drives a chain or belt 30 which engages with the inner circular frame 2. The inner circular frame 2 engages a plurality of support wheels 3, 4, 5 and 6 at one distal end and support wheels 3a, 4a, 5a and 6a at the opposite distal end, as best shown in FIG. 2, whereby said inner circular frame 2 rotates freely within outer frame 1a. The plurality of support wheels 3, 4, 5 and 6, as well as support wheels 3a, 4a, 5a and 6a engage inner circular frame 2 at curve track portions 2a and 2b so that said support wheels are retained within tracks 2a and 2b thereby keeping inner circular frame 2 within outer frame 1a. The rotatable support wheels 3–6 and 3a–6a, are affixed to outer frame 1a and directed inward towards inner circular frame 2 and tracks 2a and 2b, contacting said inner circular frame 2 at eight separate points, four of said points being at one distal end of the interior circular frame as indicated by numerals 3–6 and the other four points being at the opposite distal ends of said inner circular frame as indicated by numerals 3a–6a. Rotatable wheels 3, 4, 5, and 6, as shown in FIG. 1, allow interior circular frame 2 to rotate freely within the outer frame 1a, said rotation being powered by drive motor unit 25 shown in FIG. 9.

Drive motor unit 25 engages chain or belt 30 which, in turn, circumferentially wraps interior circular frame 2 so that when drive motor unit 25 is activated thereby turning belt 30, interior circular frame 2 rotates. The rotation of interior circular frame 2 within the outer frame 1a by belt drive motor 25 is at a preselected rate, such as, for example, a rotational speed of 10 to 60 rotations per minute. As shown in FIG. 9, the belt attached to drive motor 25 may also be a chain and drive socket assembly 31 attached to a drive shaft 32, wherein drive shaft 32 is turned by drive motor 25. Chain 30 is driven by sprocket 31a which is attached to drive shaft 32 and engages idler sprockets 33 and 34 in circumferentially wrapping and engage interior circular frame 2. Chain 30 may circumferentially wrap interior circular frame 2 in its entirety so that interior circular frame 2 may rotate within outer frame 1a a full 360 degrees without requiring drive motor 25 to be placed into reverse. Alternatively, the chain 30 may only wrap a portion of interior circular frame 2 and be fixedly secured at each end so that drive motor 25, when activated, fully rotates container 21 located therein for dumping, and after completion of the dumping cycle, drive motor 25 may be reversed to bring the container 21 to an upright position. If chain 30 circumwraps interior frame 2 in its entirety, drive motor 25 rotates interior frame 2 dumping the contents of container 21 and continues turning the interior frame 2 in the same direction until the container 21 is brought to its upright position.

As shown in FIG. 2, Interior frame 2 is designed so that top portion 2c of FIG. 2 is left substantially open without any support bars thereacross so that when lid lifter assembly 110 magnetically engages container top 21b, the actuator arm 16 of the lid lifter assembly 110 may raise the lid 21b outside the top portion of interior circular frame 2c without hindrance. This also allows the contents of container 21 to be removed from interior frame 2 after rotation of the interior circular frame 2 by the belt drive motor 25. Outer frame 1a is designed so that bottom area 1c, is substantially open and without support frame structure thereacross so that when interior circular frame 2 is rotated 180 degrees, the contents of container 21 may be discharged from within the container 21 through the top of interior circular frame 2, now rotated 180° inverted and through the bottom area 1c of FIG. 2, of the exterior frame 1a of transfer car 1, said 180° rotated container being shown in FIG. 7.

Figure 5:
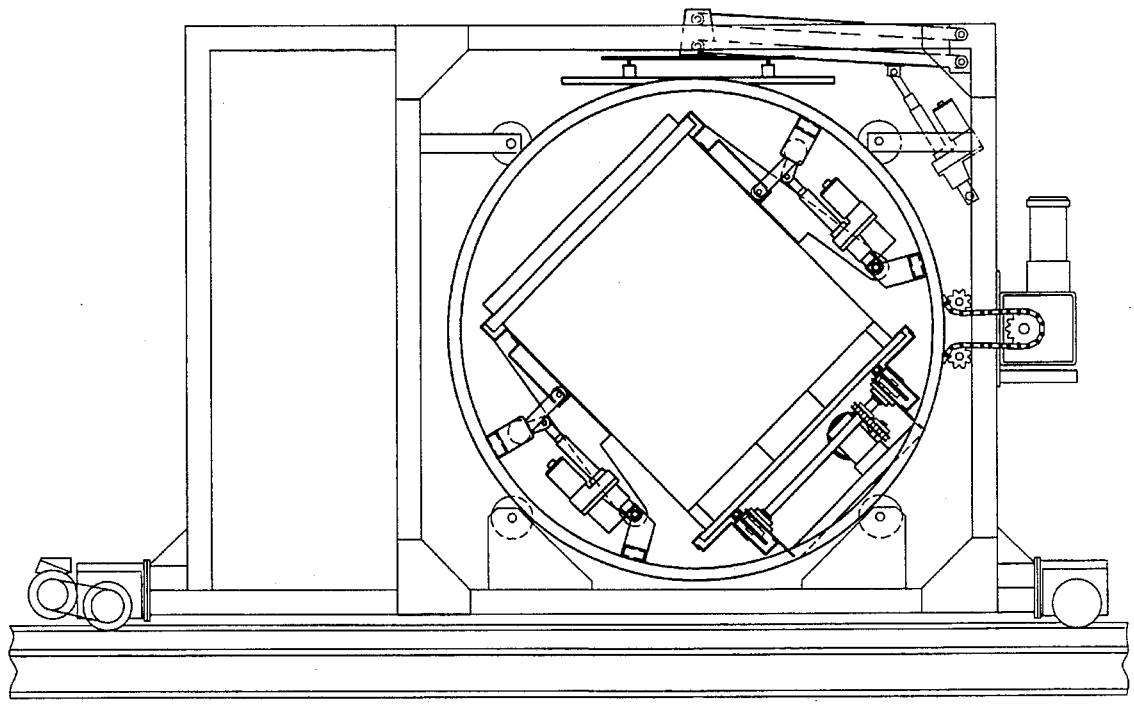
Figure 6:
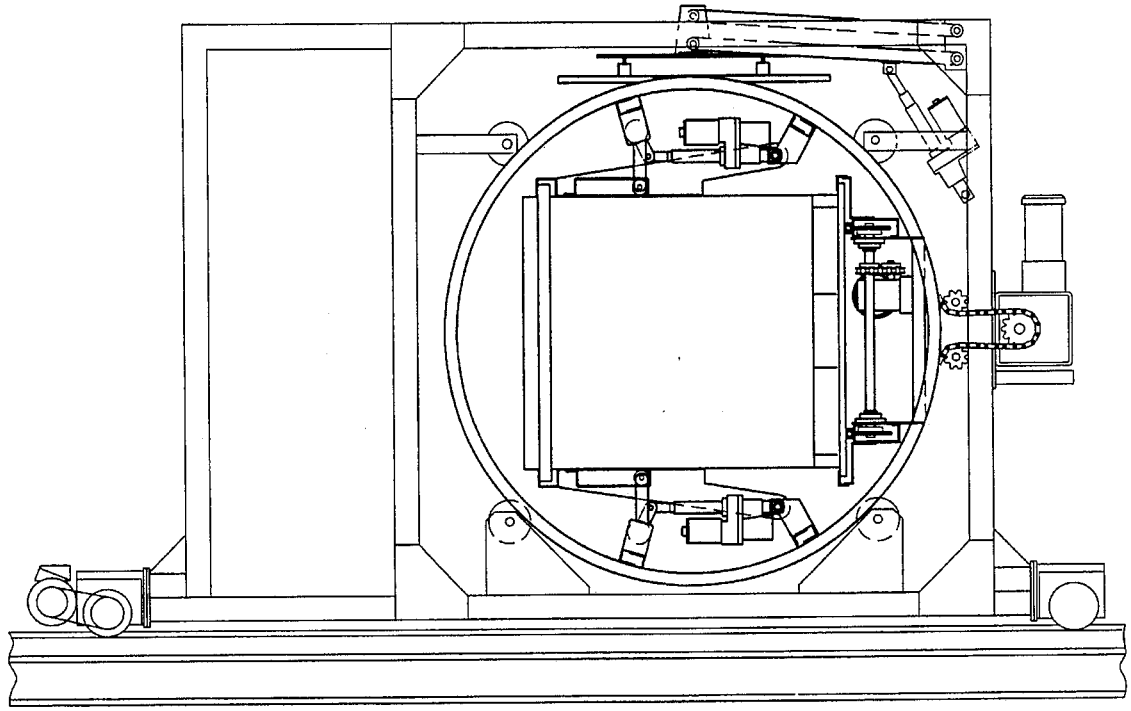
Figure 7:
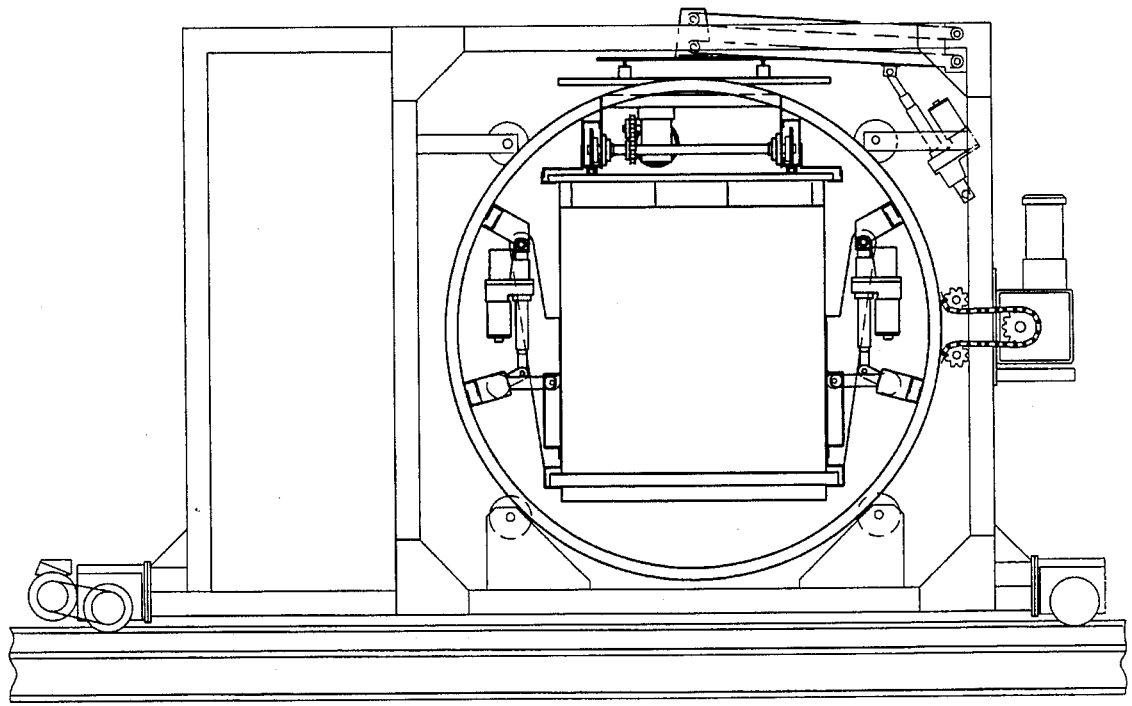

As shown on FIGS. 4, 5, 6 and 7, FIG. 4 shows a container 21 within the transfer car 1, its lid 21b raised outside of interior circular frame 2. Drive motor 25 is activated thereby rotating the container to a rotated position of approximately 45% as shown in FIG. 5, approximately 90° as shown in FIG. 6, and a dumping position of 180° as shown in FIG. 7.

As best shown in FIGS. 1 and 8, positioning clamp assembly 70 supports and secures the container 21 as it is rolled over. Clamp assembly 70 is fitted with hooks or cleats 7b that fit over ribbed side members 9 of container 21 or vibrator units, not shown in the drawings, to insure a complete emptying of the container 21. Thus, as the transfer car 1 approaches a dumping site or station subsequently rotating container 21 to dump the contents therein into a tobacco bulker (not shown), vibrator units which may be attached to positioning clamp assembly 70 will be activated thereby providing a vibration resonating throughout the container 21 causing compacted portions of the material contained therein to be dislodged and subsequently dumped out. As a further enhancement, a camera system (not shown) may be attached to the upper portion of outer frame 1 near the lid lifter assembly 110 to allow the scanning of the interior of container 21 to ensure all material held therein has been dumped as the container 21 is rotated back to its upright position.

In one example of use of the novel transfer car 1 described herein, a rail system with a plurality of transfer cars 1 located thereon transport containers 21 full of tobacco to a series of bulkers, the bulkers being utilized in loosening compacted stored tobacco which occurs from long periods of storage of tobacco in containers 21. In this example, a storage facility may contain a large number of tobacco storage containers 21 stored in a plurality of aisles wherein the containers 21 are stacked one on top of the other. Each aisle is provided with a conveyor for forwarding containers 21 removed from the storage shelves by an automatic storage retrieval unit to an outbound station. The conveyors direct the containers 21 to the outbound station at one end of an aisle system adjacent to rails 24 wherein a plurality of transfer cars are located thereon. For example, a transfer car 1 located at the outbound station is loaded with a container 21. The container 21 is loaded from the storage facility aisle conveyor system onto a power conveyor with runners indicated as elements 12 through 14 in FIG. 1 within the transfer car. The power conveyor 12 located on the transfer car 1 advances the tobacco container 21 into the transfer car 1 until an over travel sensor (not shown) indicates that the proper position within the car has been reached, the proper position being centrally disposed within the interior circular frame 2, as shown in FIG. 2. If the sensor indicates that the container 21 has been advanced too far within the transfer car 1, the conveyor 12 will reverse, retracting the container 21 allowing it to be entered once again into the interior circular frame 2. If the container 21 cannot be properly positioned within the transfer car, the over travel sensor will indicate such to allow for a repetition of a predetermined number of reload attempts and failing that, human intervention will be required.

Once the container 21 is properly positioned within the transfer car 1 and situated properly within the interior circular frame 2, positioning clamp assembly 70 with cleats 7b thereon are activated so that cleats 7b on positioning arms 7c and 7d are firmly engaged upon rib portion 9 on container 21. When container 21 is properly positioned and secured within the transfer car 1, drive motor 23 is activated engaging rail wheel 22 causing the transfer car 1 to advance upon the rails 24 towards a predetermined location for dumping within a bulker. Rails 24 may be positioned overhead in a tobacco manufacturing facility such that when the transfer car 1 approaches the tobacco bulkers, the transfer car 1 is positioned directly above the open top of the bulker. The transfer car 1, upon debarkation from the storage facility, has a predetermined destination bulker wherein the transfer car 1 follows a predetermined path on the rails 24 to a specific tobacco bulker. Once positioned properly over the tobacco bulker, electromagnets 17 through 20 are activated and actuator arm 16 of lid lifter assembly 110 is lowered by activation of ball screw unit 16a so that the electromagnets come into contact with the lid 21b of container 21. Ball screw unit 16a is then actuated so that the container lid 21b is raised above the inner circular frame portion 2c thereby allowing proper rotation of the interior circular frame 2 within outer frame 1a. Once the lid 21b is removed from within the interior circular frame 2, a sensor indicates that it is clear and chain drive 25 begins to rotate. Chain drive assembly 31 turns chain 30 via drive shaft 32 and drive sprocket 31a thereby rotating interior circular frame 2 in a counter clock-wise direction at, for example, a maximum rotational speed of 60 feet per minute. Once rotated 180°, the contents of the container 21, stored and somewhat compressed tobacco, are dumped into the tobacco bulker. If the system is equipped with vibrator units, the units located on the actuator arms 7c and 7d are activated so as to vibrate throughout the container 21 and cause a complete emptying of the contents therein when container 21 is held in the up-turned position. Chain drive assembly 31 is then reactivated to either continue the counter clock-wise rotation of interior circular frame 2 to an upright position or, if the chain 30 does not completely circumscribe the interior circular frame 21, the chain drive 25 is placed in reverse and the interior circular frame 2 is rotated in a counter clock-wise direction until the container 21 is in the proper upright position. The rotation of the interior circular frame 2 is facilitated by a plurality of rotatable support wheels 3a–6a rotatably connected to exterior frame 1a. Once the container 21 is in an upright position, if the transfer car 1 is equipped with a vision system, a camera (not shown) within the vision system will cause the scanning of the interior portion of the container 21 thereby insuring the proper removal of all contents located therein. If it is determined that there are still remnants of the stored tobacco within the container 21, the container 21 will again be rotated 180° and the vibrator units, if equipped on the transfer car 1, will be activated to ensure proper dislodging of the contents therein. Once all of the contents of the container 21 have been removed, rail drive motor 23 will again be activated to advance the transfer car 1 back to the storage facility at, for example, a maximum speed of 200 feet per minute. The transfer car will return to the storage facility where the transfer car will stop adjacent to an inbound station. The inbound station is located at the end of the aisle conveyors which go between the storage racks. After stopping at said inbound station, the power conveyor located on said transfer car will be activated powering runners 13 and 14 upon which container 21 is resting upon. Said runners are powered by drive motor 12. Once activated, the power conveyor 12 will move the empty container 21 onto a moving conveyor at the inbound station whereupon the container 21 will be forwarded to an empty storage container rack. The transfer car 1 may then again be used at the outbound station for loading of a full container 21 of tobacco.

The foregoing detailed description is given primarily for clearness of understanding and no unnecessary limitations are to be understood therefrom for modifications can be made by those skilled in the art upon reading this disclosure and may be made without departing from the spirit of the invention and scope of the appended claims.

What is claimed is:

1. A transfer car for transporting a container of material comprising:

an outer frame mounted to means to move said transfer car;

an interior circular frame rotatably mounted to and disposed within said outer frame;

means for rotating said interior circular frame;

a conveyor mounted to and within said interior circular frame for moving the container into said interior circular frame;

a container lid lifter mounted to an upper portion of said outer frame for raising and lowering a lid of said container;

positioning clamps mounted to and disposed within said interior frame for maintaining said container within said interior circular frame while said car is moving and while said interior circular frame is rotated; and, means for powering said car for horizontal travel.

2. The car of claim 1 wherein said interior circular frame rotates upon a plurality of support wheels.

3. The car of claim 2 wherein said plurality of support wheels rotatably engage said interior circular frame.

4. The car of claim 3 wherein said interior circular frame has a pair of concave tracks which receive said plurality of support wheels.

5. The car of claim 1, said lid lifter including a plurality of electromagnets, said plurality of electromagnets magnetically engage the lid of said container.

6. The car of claim 1 wherein said positioning clamps comprise a pair of power-driven fitted hooks fixedly attached to said interior circular frame, said hooks engagable with said container.

7. The car of claim 1, said means for rotating said interior circular frame including a motor driven belt circumferentially lining said interior circular frame, said interior circular frame being rotatable within said outer frame in response to movement of said belt.

8. The car of claim 1 wherein said means for powering said car for horizontal travel comprises a plurality of rail mounted wheels and a drive motor attached to at least one of said wheels.

* * * * *